No. 747,083. PATENTED DEC. 15, 1903.
J. PIERCE.
UNDERCUTTER.
APPLICATION FILED FEB. 10, 1903.
NO MODEL.

Witnesses:

Inventor:
Joseph Pierce

No. 747,083. Patented December 15, 1903.

UNITED STATES PATENT OFFICE.

JOSEPH PIERCE, OF TUMWATER, WASHINGTON.

UNDERCUTTER.

SPECIFICATION forming part of Letters Patent No. 747,083, dated December 15, 1903.

Application filed February 10, 1903. Serial No. 142,819. (No model.)

*To all whom it may concern:*

Be it known that I, JOSEPH PIERCE, a citizen of the United States, residing at Tumwater, in the county of Thurston, State of Washington, have invented a new and useful Undercutter, of which the following is a full, clear, and exact description.

Reference is made to the accompanying drawings, forming a part of this specification, in which similar letters of reference indicate corresponding parts in both the figures.

Figure 1:
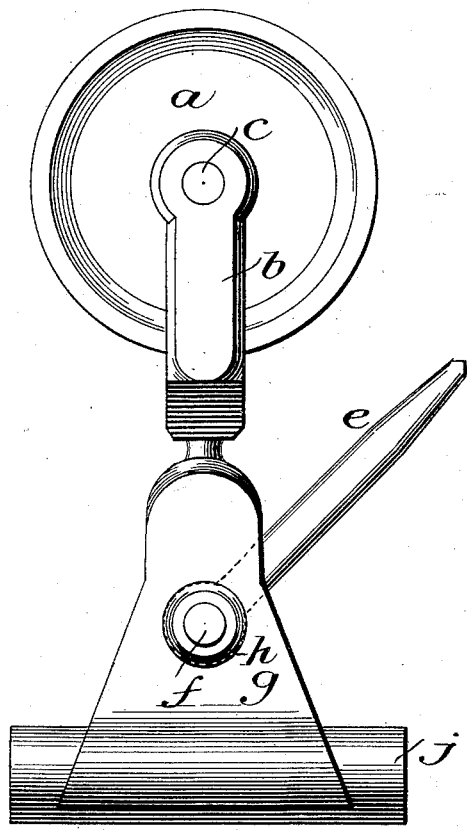
Figure 2:
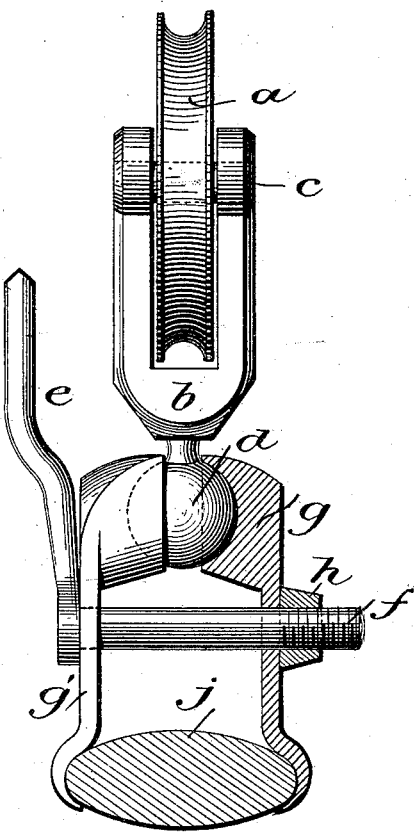

Figure 1 is a side view of my undercutter, and Fig. 2 is an end view.

The object of my invention is to provide a simple and efficient device for holding a saw in position to saw a log in the woods or elsewhere from underneath when it is necessary to do so by reason of the log or tree lying in such a position as to bind on top so it cannot be sawed from the top, or where the pressure is upward at the place to be sawed and it is necessary to undercut it for a piece in order to prevent the tree from splitting, and thereby injuring the same.

My invention consists of a wheel $a$ with groove on the disk for back of saw to rest in while in position for sawing from underneath, which wheel will revolve as the saw is drawn back and forth in the operation of sawing. The wheel is pivoted at $c$ on an ax in the center to a shank $b$, which shank ends in a ball-socket $d$, Fig. 2. The ball-socket rests between two clamps $g$, which are held together by a bar $f$, with threads on one end, which screws in one of the shanks and upon which end it is held in place by a nut $h$. This bar is attached to a lever $e$. The clamps are tightened or loosened by turning the lever. The clamps have a groove and inward turn on the lower end to attach to the ax-handle or other support $j$, used when it is placed in position to be used. By turning and unscrewing the lever the clamps will be drawn apart, and it will be seen that the clamps will loosen, so it may be detached from the ax-handle or other support. By the same process and loosening the ball-socket is loosened, so that the wheel and shank may be adjusted in any position, so that in Fig. 1 the wheel and shank may present a side view or any degree less, or in Fig. 2 the wheel and shank may present an end view or any degree less, or the wheel and shank may be revolved, so that the wheel $a$ and the shank $b$ will occupy a position at right angles with the clamps $g$ or any degree less, or such a number of degrees more as will cause the wheel and shank to come in contact with the clamps $g$ and support $j$.

My undercutter is small, light, of metal, and easily carried.

I am aware that prior to my invention contrivances for holding a saw when sawing from underneath have been used; but such contrivance only consisted of a wheel.

What I do claim as my invention, and what I desire to secure by Letters Patent, is—

The combination of wheel, with groove on its periphery, pivoted on a shank ending in a ball-socket, resting in clamps arranged so as to be attached to an ax-handle, or support, and thus to be adjustable to different positions desired.

In testimony whereof I have subscribed my name to this specification in the presence of two subscribing witnesses.

JOSEPH PIERCE.

Witnesses:
  P. M. TROY,
  O. J. FALKNOR.